US005549049A

United States Patent [19]
Deandrea

[11] Patent Number: 5,549,049
[45] Date of Patent: Aug. 27, 1996

[54] DISK-TYPE ADJUSTABLE SUPPORTING DEVICE FOR OVERHEAD RUNWAYS

[75] Inventor: Giorgio Deandrea, Rivoli, Italy

[73] Assignee: Fata Automation S.p.A., Turin, Italy

[21] Appl. No.: 340,859

[22] Filed: Nov. 15, 1994

[51] Int. Cl.[6] .................................................. E01B 25/24
[52] U.S. Cl. ............................ 104/111; 403/4; 403/337
[58] Field of Search ............................ 104/89, 111, 110, 104/107, 106, 91, 93, 95; 403/3, 4, 337; 248/228.1, 228.4; 16/94 R, 94 D

[56] References Cited

U.S. PATENT DOCUMENTS

| 943,461 | 12/1909 | Reynolds | 403/337 X |
|---|---|---|---|
| 1,251,483 | 1/1918 | Days | 16/94 R X |
| 3,929,078 | 12/1975 | Sears | 104/111 |
| 4,106,876 | 8/1978 | Tregoning | 403/4 |
| 4,646,647 | 3/1987 | Spoler et al. | 104/111 |

FOREIGN PATENT DOCUMENTS

| 3338840 | 5/1985 | Germany | 104/111 |
|---|---|---|---|
| 2129389 | 5/1984 | United Kingdom | |

*Primary Examiner*—Robert J. Oberleitner
*Assistant Examiner*—Kevin D. Rutherford
*Attorney, Agent, or Firm*—Finnegan, Henderson, Farabow, Garrett & Dunner

[57] ABSTRACT

A supporting device (10) for overhead runways comprises a fastening and adjusting coupling for connecting a bracket (12) (the lower end of which is secured to the rail (13)) to an upper suspension beam (11). The coupling comprises a first (20) and a second (23) element for connecting the beam to the bracket, the first element defining a circumferential rim (19), two parallel plates (14, 15) being interconnected by bolts (16, 17, 18) which reciprocally close together to grip the circumferential rim between the plates thereby enabling the reciprocal rotation of the element and plates around a vertical axis. The plates (14, 15) are adjustably connected to the second element to allow adjustment of the reciprocal gap between the first and second elements.

9 Claims, 2 Drawing Sheets

DISK-TYPE ADJUSTABLE SUPPORTING DEVICE FOR OVERHEAD RUNWAYS

BACKGROUND OF THE INVENTION

This invention refers to a supporting device for an overhead runway, for example a monorail. In the technique of material handling systems, for example in factories, it is known that use is made of systems referred to as "self-propelled" which use overhead rails along which run motor-driven carriages. The rails are supported by securing them, by means of generically C-shaped supporting brackets, to beams above the system. As a rule, a large number of brackets are used in such systems and it is consequently preferable to keep the cost of each individual bracket to a minimum. This contrasts with the need to provide adjustment of the bracket both in height and around a vertical axis, to allow orientation and levelling of the rails regardless of the precise disposition of the supporting beams or the reciprocal orientation of the runways and the beams, especially on curves where the U-bolts usually have to be disposed radially to the curve.

In the known technique various adjusting devices have been proposed, comprising for example a vertical sleeve, permitting rotation of the bracket, onto which a screw or a ring is screwed to enable the bracket to be positioned in height. These systems offer satisfactory adjustment but have the disadvantage of being particularly sensitive to transversal stress on the runway.

Devices have also been proposed in which a horizontal plate, secured to the beam, comprises semicircular slots traversed by screws supporting the bracket. The bracket can thus be adjusted in height, by tightening or loosening the screws, as well as in an angular direction, by sliding the screws along the slots. These devices offer better resistance and stability against transversal thrust but allow limited angular adjustment.

SUMMARY OF THE INVENTION

The general scope of this invention is to obviate the aforementioned problems by providing a supporting bracket which is inexpensive while at the same time offering easy continuous adjustment and remaining securely and firmly fastened.

This scope is achieved, according to the invention, by providing a supporting device for overhead runways, comprising a fastening and adjusting coupling for connection, at least rotatable according to a substantially vertical axis, of a bracket with its lower end secured to the rail, to an upper suspension beam, characterized by the fact that the coupling comprises a first and a second element for the fastening between the beam and the bracket, the first element defining a circumferential rim disposed in a plane perpendicular to said axis, two parallel plates being interconnected by bolts which reciprocally close together to grip said circumferential rim between the plates thereby enabling, at least when the bolts are loosened, the reciprocal rotation of the element and plates around said axis, the plates having means for connecting them to the second element.

BRIEF DESCRIPTION OF THE DRAWINGS

The innovatory principles of this invention and its advantages with respect to the known technique will be more clearly evident from the following description of a possible exemplificative and non-restrictive embodiment applying such principles, with reference to the accompanying drawings, in which.

DETAILED DESCRIPTION OF THE INVENTION

Figure 1:
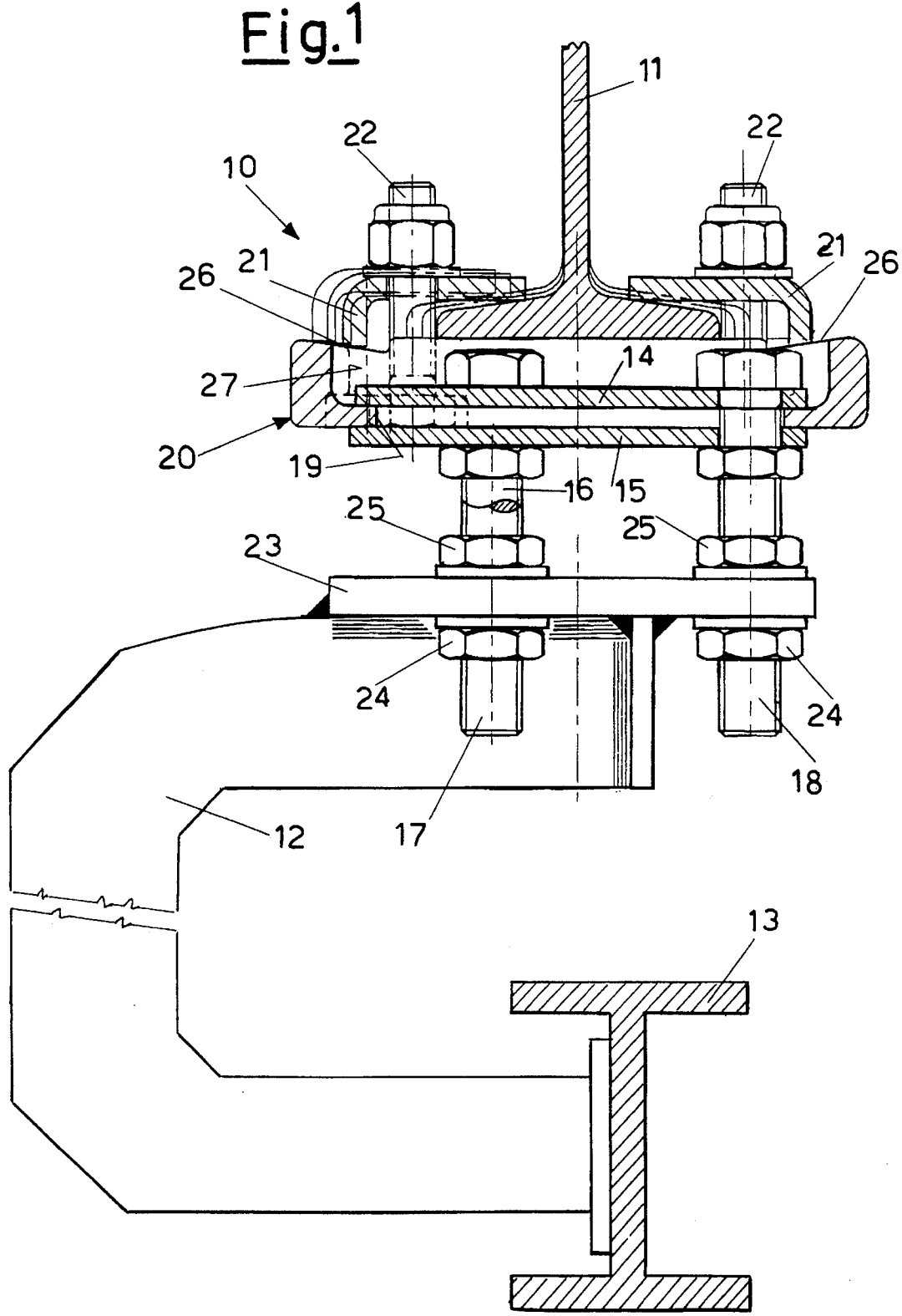
FIG. 1 shows a schematic front cutaway view along the line I—I of FIG. 3, of a device according to the invention.
Figure 2:
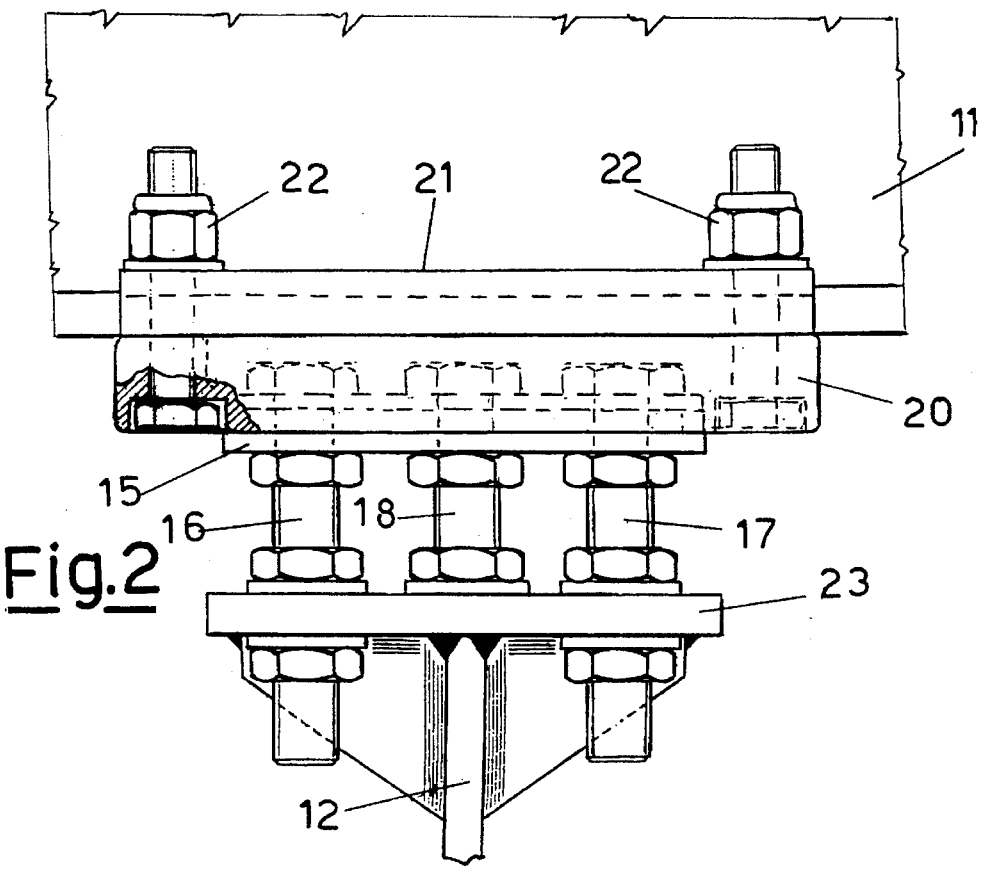
FIG. 2 shows a rear partial view of the device of FIG. 1.

With reference to the figures, FIG. 1 shows an adjustable supporting device 10, superiorly secured to an I-beam 11 and from which inferiorly extends a generically C-shaped supporting bracket 12, the lower end of which being secured to a runway 13, for example a monorail along which run known motor-powered conveyor carriages in an industrial system, such as an assembly line.

Figure 3:
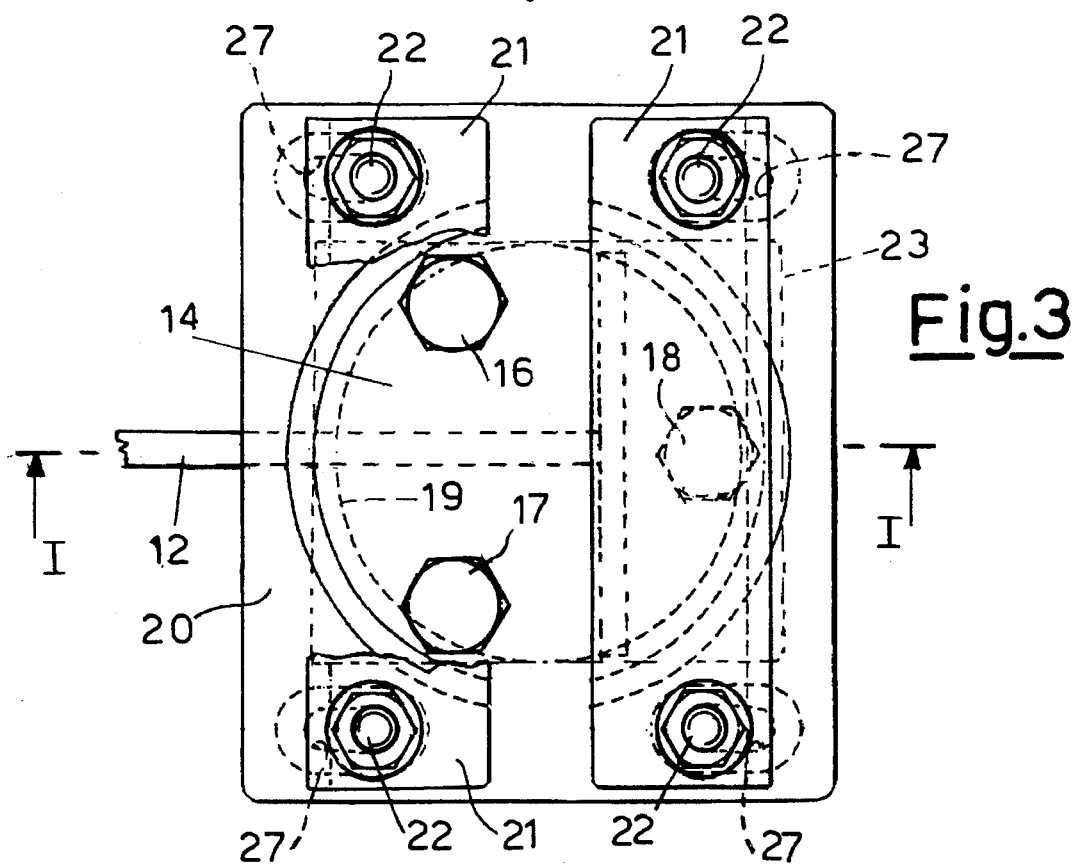
FIG. 3 shows a top partial view of the device of FIG. 1.

As can also be clearly seen in FIG. 3, the adjustable supporting device 10 comprises a casing or first element 20, secured superiorly to the lower edge of the beam by means of fastening elements composed for example of a pair of splice bars 21 clamped onto the flange of the beam by means of pairs of tie bolts 22. As can be seen in FIG. 1, the splice bars can be advantageously L-shaped with their lower end resting on upper surfaces of the casing sloping downwards towards the beam. Moreover, the holes 27 for the passage of the bolts in the casing 20 are in the form of an elongated slot crosswise to the beam. In this way, as can be clearly seen in FIG. 1, the splice bars can be adapted to different sized beams remaining with their gripping ends substantially horizontal or otherwise orientated to offer the best possible grip.

The casing 20 has a central hole which defines a circumferential rim 19 disposed in a substantially horizontal plane. A pair of circular plates 14, 15 are disposed facing each other and interconnected by means of three bolts 16, 17, 18 which move towards one another, passing through the central hole, to grip the rim 19 between them rotatingly according to a vertical axis. The bolts 16, 17 18 have a shank extending downwards to fit into respective holes in a second plate-shaped element 23 which is secured, for example by welding, to the upper end of the bracket 12. The plate 23 is secured to the shanks of the bolts by means of nuts 24 and lock nuts 25 to allow adjustment of the gap between plates 14, 15 and plate 23.

The bracket 12 is thus able to rotate around a vertical axis, by loosening the bolts securing the pair of plates, and to ascend and descend by shifting the position of the nuts 24 and lock nuts 25.

The nuts and lock nuts can also be shifted asymmetrically on the various shanks (that is to say, positioned at different heights on the various shanks), so as to adjust the slant of the bracket, which is useful for example to compensate for lack of parallelism between the plane of the beam and the runway.

At this point it will be clear that the intended scope is achieved, by providing a device for adjusting the position of the bracket which is easy to manufacture, sturdy and permits ample adjustment, enabling continuous rotation by 360°.

The foregoing description of an embodiment applying the innovative principles of this invention is obviously given by way of example in order to illustrate such innovative principles and should not therefore be understood as a limitation to the sphere of the invention claimed herein. For example, although the figures show the pair of plates connected to the bracket and the casing connected to the beam suspension element, the opposite is obviously possible. Moreover, the bolts used for adjusting the gap can be provided in a larger number, for example, four. Lastly, the gripping plates 14, 15 can also be made in the form of circular rings which grip between their inner edges the rim of the casing, directed radially outwards instead of inwards.

What is claimed is:

1. A coupling device for adjustably supporting a rail of an overhead runway from an upper suspension beam, said device connecting and permitting relative rotation about a substantially vertical axis of a bracket, the lower end of which is secured to the rail, with respect to the upper suspension beam and comprising a first and a second element, one of said elements being connected to the beam and the other element to the bracket with the first element having a circumferentially extending rim disposed in a plane perpendicular to said axis, two parallel plates located on either vertical side of said rim and interconnected by bolts, which bolts when tightened grip between them said circumferential rim and prevent relative rotation between the first element and the plates and when loosened permit relative rotation between the first element and the plates around said axis, and connecting means for connecting the plates to the second element so that when the plates rotate relative to the first element, the second element rotates relative to the first element.

2. The device of claim 1, wherein the connecting means between the plates and the second element is adjustable, to permit adjustment of the distance between the first and second elements.

3. The device of claim 2, wherein the connecting means comprises shanks on the bolts that extend beyond said plates and are secured with nuts and lock nuts to said second element to permit adjustment of the distance between the first and second elements.

4. The device of claim 1, wherein the first element has a central hole around the circumference of which is the circumferentially extending rim, the plates extending over the hole and gripping the rim by their outer edges with the bolts connecting the plates extending through said hole.

5. The device of claim 1, wherein one of said first and second elements is secured to the beam by a pair of splice bars disposed close to lateral edges of the beam.

6. The device of claim 5, wherein the splice bars are L-shaped with one arm of the L facing towards and resting upon said one element and the other arm facing sideways along the corresponding lateral edge of the beam, and including splice bolts disposed between the lateral arm of the L and said one element to pull the splice bar towards said one element and grip the corresponding lateral edge of the beam between said one element and the splice bar.

7. The device of claim 6, wherein the splice bars rest upon said one element in correspondence with a bearing surface slanting downwards in the direction of the lateral edge of the beam and the splice bolts between the arm and said one element traverse said one element in correspondence with elongated slots disposed crosswise to the beam to allow adjustment of the position of the splice bars according to different dimensions of the beam.

8. The device of claim 1, wherein the first element is connected to the beam and the second element is connected to the bracket.

9. The device of claim 1, including at least three bolts connecting the plates to said second element.

* * * * *